US009786129B2

(12) United States Patent
Travis

(10) Patent No.: US 9,786,129 B2
(45) Date of Patent: Oct. 10, 2017

(54) SYSTEM AND METHOD FOR ENHANCING A GAME OF CHANCE

(71) Applicant: Video Gaming Technologies, Inc., Franklin, TN (US)

(72) Inventor: Alan Travis, Spring Hill, TN (US)

(73) Assignee: Video Gaming Technologies, Inc., Franklin, TN (US)

( * ) Notice: Subject to any disclaimer, the term of this patent is extended or adjusted under 35 U.S.C. 154(b) by 316 days.

(21) Appl. No.: 14/575,104

(22) Filed: Dec. 18, 2014

(65) Prior Publication Data

US 2016/0180635 A1    Jun. 23, 2016

(51) Int. Cl.
*A63F 13/00* (2014.01)
*G07F 17/32* (2006.01)

(52) U.S. Cl.
CPC .......... *G07F 17/329* (2013.01); *G07F 17/326* (2013.01); *G07F 17/3209* (2013.01)

(58) Field of Classification Search
CPC ............. G07F 17/3204; G07F 17/3211; G07F 17/3213
USPC ............................................... 463/16, 20, 31
See application file for complete search history.

(56) References Cited

U.S. PATENT DOCUMENTS 7,607,980 B2 10/2009 Masci et al.
7,931,528 B2 4/2011 Singer et al.
8,357,041 B1 1/2013 Saunders
8,414,380 B2 4/2013 Saunders et al.
8,430,737 B2 4/2013 Saunders
8,485,901 B2 7/2013 Saunders
8,500,539 B2 8/2013 Huynh et al.
8,662,986 B2 3/2014 Rodgers et al.
8,690,660 B2 4/2014 Saunders et al.
8,777,718 B2 7/2014 Smith et al.
2003/0017868 A1 1/2003 Crawford
2006/0073879 A1* 4/2006 Baerlocher ............. G07F 17/32 463/20
2006/0281525 A1 12/2006 Borissov
2007/0281773 A1 12/2007 Sprinkle et al.
2008/0113775 A1* 5/2008 Williams ............ G07F 17/3202 463/25
2010/0029364 A1* 2/2010 Zielinski ............. G07F 17/3244 463/20
2010/0029369 A1* 2/2010 Pacey ..................... G07F 17/34 463/20
2013/0023336 A1 1/2013 Saunders
2013/0267302 A1 10/2013 Saunders et al.
2013/0303259 A1 11/2013 Saunders
(Continued)

FOREIGN PATENT DOCUMENTS

WO 2014128561 A2 8/2014

*Primary Examiner* — James S McClellan
(74) *Attorney, Agent, or Firm* — Armstrong Teasdale LLP

(57) ABSTRACT

A gaming machine associates each position in a plurality of positions with one of a plurality of markers including at least a first marker and a second marker, identifies a plurality of patterns including at least one position of the plurality of positions, determines whether at least one pattern of the plurality of patterns satisfies a predetermined first threshold based on the first marker of the plurality of markers, and determines whether at least one pattern of the plurality of patterns satisfies the predetermined first threshold based on the second marker of the plurality of markers.

12 Claims, 5 Drawing Sheets

(56) References Cited

U.S. PATENT DOCUMENTS

| | | | |
|---|---|---|---|
| 2013/0324211 | A1 | 12/2013 | Huynh et al. |
| 2014/0162756 | A1 | 6/2014 | Rodgers et al. |

* cited by examiner

SYSTEM AND METHOD FOR ENHANCING A GAME OF CHANCE

BACKGROUND

The field of the disclosure relates generally to gaming systems, and, more particularly, to methods and systems for enhancing a game of chance.

Conventionally, bingo games and/or gaming machines based on bingo games provide one or more opportunities to obtain a winning combination. At least some known bingo games use bingo cards that include a plurality of squares, wherein each square is associated with a respective number. Generally, a square is marked or "daubed" when the number associated with the square matches a drawn, called, or otherwise generated number. Generally, numbers are generated until the daubed squares match a winning pattern.

BRIEF SUMMARY

In one aspect, a method is provided for presenting a game of chance on a gaming machine. The method includes associating each position in a plurality of positions with one of a plurality of markers including at least a first marker and a second marker, identifying a plurality of patterns including at least one position of the plurality of positions, determining whether at least one pattern of the plurality of patterns satisfies a predetermined first threshold based on the first marker of the plurality of markers, and determining whether at least one pattern of the plurality of patterns satisfies the predetermined first threshold based on the second marker of the plurality of markers.

In another aspect, one or more computer-readable storage media having computer-executable instructions embodied thereon is provided. When executed by at least one processor, the computer-executable instructions cause the at least one processor to associate each position in a plurality of positions with one of a plurality of markers including at least a first marker and a second marker, identify a plurality of patterns including at least one position of the plurality of positions, determine whether at least one pattern of the plurality of patterns satisfies a predetermined first threshold based on the first marker of the plurality of markers, and determine whether at least one pattern of the plurality of patterns satisfies the predetermined first threshold based on the second marker of the plurality of markers.

In yet another aspect, a gaming machine is provided. The gaming machine includes a frame, and a gaming controller coupled to the frame. The gaming controller includes at least one processor, and one or more computer-readable storage media having computer-executable instructions embodied thereon. When executed by the at least one processor, the computer-executable instructions cause the at least one processor to associate each position in a plurality of positions with one of a plurality of markers including at least a first marker and a second marker, identify a plurality of patterns including at least one position of the plurality of positions, determine whether at least one pattern of the plurality of patterns satisfies a predetermined first threshold based on the first marker of the plurality of markers, and determine whether at least one pattern of the plurality of patterns satisfies the predetermined first threshold based on the second marker of the plurality of markers.

The features, functions, and advantages described herein may be achieved independently in various embodiments of the present disclosure or may be combined in yet other embodiments, further details of which may be seen with reference to the following description and drawings.

BRIEF DESCRIPTION OF THE DRAWINGS

FIG. 1 is a schematic diagram of an example gaming machine;

FIG. 2 is a schematic block diagram of an example gaming network including a plurality of the gaming machines shown in FIG. 1;

FIG. 3 is a schematic block diagram of an example computing device that may be used with the gaming machine shown in FIG. 1;

FIG. 4 includes a schematic illustration of an example play area; and

FIG. 5 is a flowchart of an example method for presenting a game of chance using the computing device shown in FIG. 3.

Figure 1:
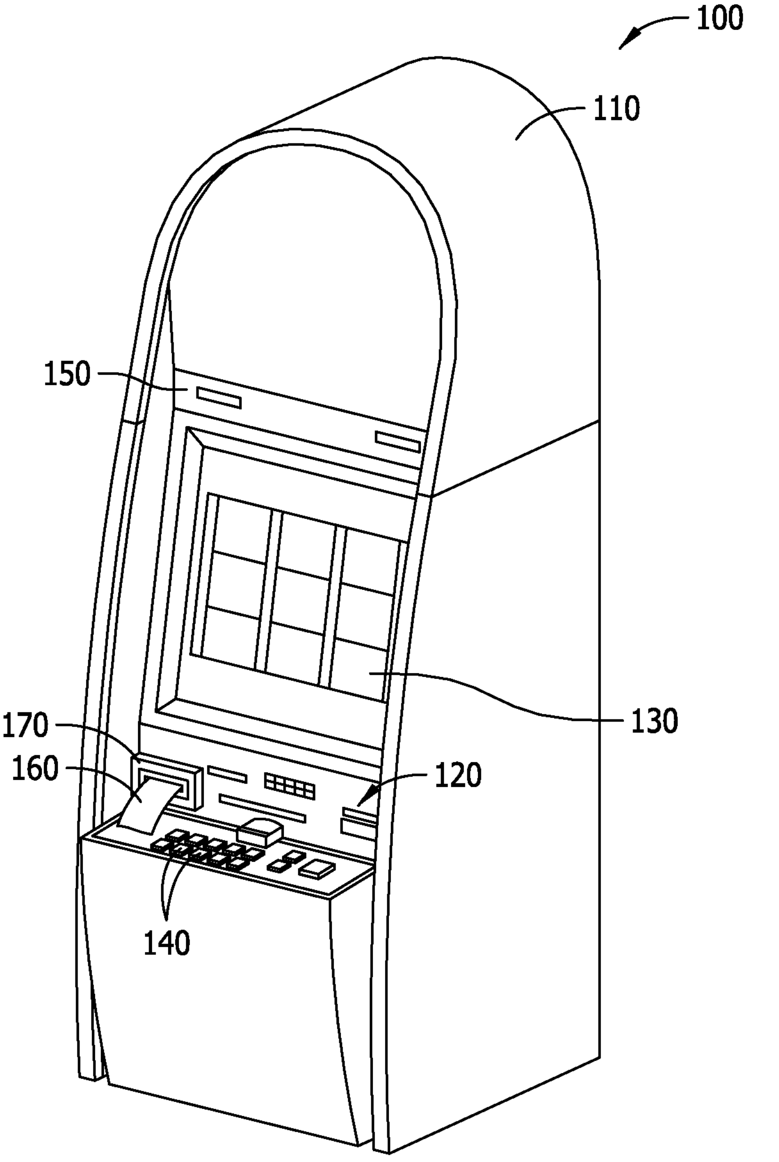
FIGS. 1-5 show example embodiments of the method and system described herein.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

Example embodiments of systems and methods for use in providing a game of chance are described herein. In one embodiment, a gaming machine associates each position in a plurality of positions with one of a plurality of markers including at least a first marker and a second marker, identifies a plurality of patterns including at least one position of the plurality of positions, determines whether at least one pattern of the plurality of patterns satisfies a predetermined first threshold based on the first marker of the plurality of markers, and determines whether at least one pattern of the plurality of patterns satisfies the predetermined first threshold based on the second marker of the plurality of markers. Accordingly, the embodiments described herein increase a number of opportunities to win a game of chance.

The methods and systems described herein may be implemented using computer programming or engineering techniques including computer software, firmware, hardware, or any combination or subset thereof, wherein the technical effects may be achieved by performing at least one of the following steps: (a) receiving a play input; (b) determining a quantity associated with a plurality of patterns based on the play input; (c) determining a quantity associated with a plurality of identifiers based on the play input; (d) generating the plurality of identifiers; (e) determining whether a quantity associated with the plurality of identifiers satisfies a predetermined threshold; (f) associating each position in a plurality of positions with one of the plurality of markers including at least a first marker and a second marker; (g) identifying the plurality of patterns including at least one position of the plurality of positions; (h) determining whether at least one pattern of the plurality of patterns satisfies a predetermined threshold based on the first marker of the plurality of markers; (i) determining whether at least one pattern of the plurality of patterns satisfies a predetermined threshold based on the second marker of the plurality of markers; (j) presenting the plurality of positions and the plurality of markers.

The following detailed description illustrates embodiments of the disclosure by way of example and not by way of limitation. It is contemplated that the disclosure has application to gaming methods and systems, in general, to facilitate increasing a number of opportunities to win a game of chance.

An element or step recited in the singular and preceded with the word "a" or "an" should be understood as not excluding plural elements or steps unless such exclusion is explicitly recited. Moreover, references to an "example embodiment" or "one embodiment" are not intended to be interpreted as excluding the existence of additional embodiments that also incorporate the recited features.

FIG. 1 is a schematic diagram of an example gaming machine 100 including a cabinet or frame 110, and a gaming controller 120 coupled to frame 110. In the example embodiment, frame 110 is configured to house a plurality of components, such as gaming controller 120, peripheral devices, presentation devices, and player interaction devices. For example, in the example embodiment, gaming machine 100 includes a plurality of input devices, such as a touch screen (e.g., presentation device 130) and switches and/or buttons 140 that are coupled to a front 150 of frame 110.

In the example embodiment, presentation device 130 is used to display one or more game images, symbols, and/or indicia such as a visual representation or exhibition of movement of an object (e.g., a mechanical, virtual, or video reel), dynamic lighting, video images, bingo cards, and the like. Presentation device 130 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user. For example, in the example embodiment, presentation device 130 is a touch screen device. In an alternative embodiment, presentation device 130 displays images and indicia using mechanical means. For example, presentation device 130 may include an electromechanical device, such as one or more rotatable reels, to display a plurality of game or other suitable images, symbols, or indicia.

Buttons 140 may include a "Bet One" button that enables the player to place a bet or to increase a bet, a "Bet Max" button that enables the player to bet a maximum permitted wager, a "Cash Out" button that enables the player to receive a cash payment or other suitable form of payment such as a ticket or voucher 160, which corresponds to a number of remaining credits, and/or a "Spin" button that enables rotation of physical or simulated reels of the slot machine.

In the example embodiment, gaming machine 100 includes an input/output (I/O) device 170 coupled to front 150 for accepting and/or validating cash bills, coupons, tickets and/or vouchers 160. I/O device 170 may also be capable of printing coupons, tickets and/or vouchers 160. Furthermore, in some embodiments, I/O device 170 includes a card reader or validator for use with credit cards, debit cards, identification cards, and/or smart cards. The cards accepted by I/O device 170 may include a magnetic strip and/or a preprogrammed microchip that includes a player's identification, credit totals, and any other relevant information that may be used.

In the example embodiment, gaming controller 120 is programmed to control and/or determine at least some functions and/or operations associated with gaming machine 100. For example, in one embodiment, gaming controller 120 is configured to generate at least one gaming event. "Gaming event" may refer to one or more events associated with gaming controller 120 including, without limitation, a game start, a win, a loss, a number of consecutive wins, a number of consecutive losses, a number of credits awarded, a number of credits lost, a close win, and a close loss.

In one embodiment, gaming controller 120 randomly generates game outcomes using probability data. For example, each game outcome is associated with one or more probability values that are used by gaming controller 120 to determine the game output to be displayed. Such a random calculation may be provided by a random number generator, such as a true random number generator (RNG), a pseudo-random number generator (PNG), or any other suitable randomization process. In one embodiment, gaming controller 120 randomly draws, calls, and/or generates a plurality of numbers used to "daub" a bingo card. Gaming controller 120 may be any type of gaming machine, and may include, without limitation, different structures than those shown in FIG. 1. Moreover, gaming controller 120 may employ different methods of operation than those described below.

Figure 2:
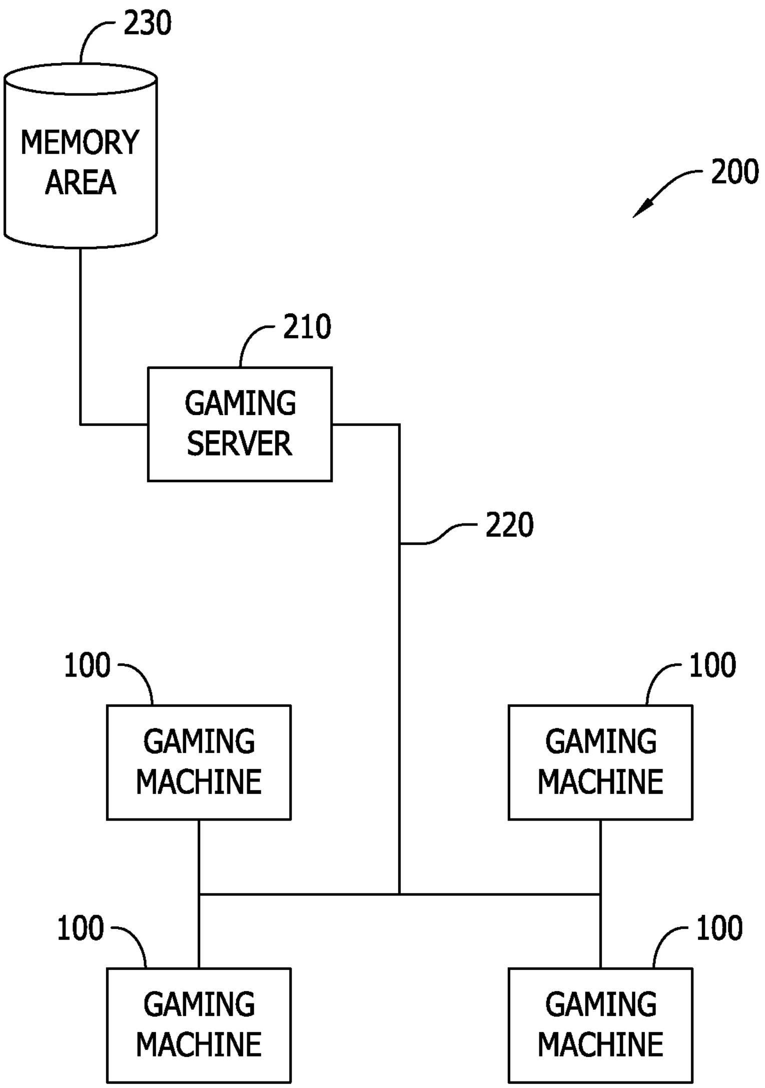

FIG. 2 is a schematic block diagram of an example gaming network 200 that includes a plurality of gaming machines 100 coupled to one or more gaming servers 210 via a communication network 220. Gaming server 210 includes a processor (not shown) that facilitates data communication between each gaming machine 100 and other components of gaming network 200. Such data is stored in, for example, a memory area 230, such as a database or a file system, which is coupled to gaming server 210.

In one embodiment, one or more gaming machines 100 may be remote gaming machines that access a casino over communication network 220. As such, a player is able to participate in a game of chance on a remote gaming machine while a player proxy is physically present at, for example, a casino or some other location. It will be understood that a player operating a remote gaming machine has virtual access to any casino coupled to communication network 220 and associated with gaming server 210. Further, while gaming machines 100 are described herein as video bingo machines, video poker machines, video slot machines, and/or other similar gaming machines that implement alternative games, gaming machines 100 may also be a personal computers coupled to the Internet or to a virtual private network such that a player may participate in a game of chance remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 210. In such an embodiment, gaming machines 100 display results of a game via presentation device 130 (shown in FIG. 1).

In one embodiment, gaming server 210 performs a plurality of functions including, for example, game outcome generation, executing a game play event for a player, player proxy selection, player tracking functions, and/or accounting functions, and data authentication functions, to name a few. However, in alternative embodiments, gaming network 200 may include a plurality of servers that separately perform these functions and/or any suitable function for use in a network-based gaming system.

Figure 3:
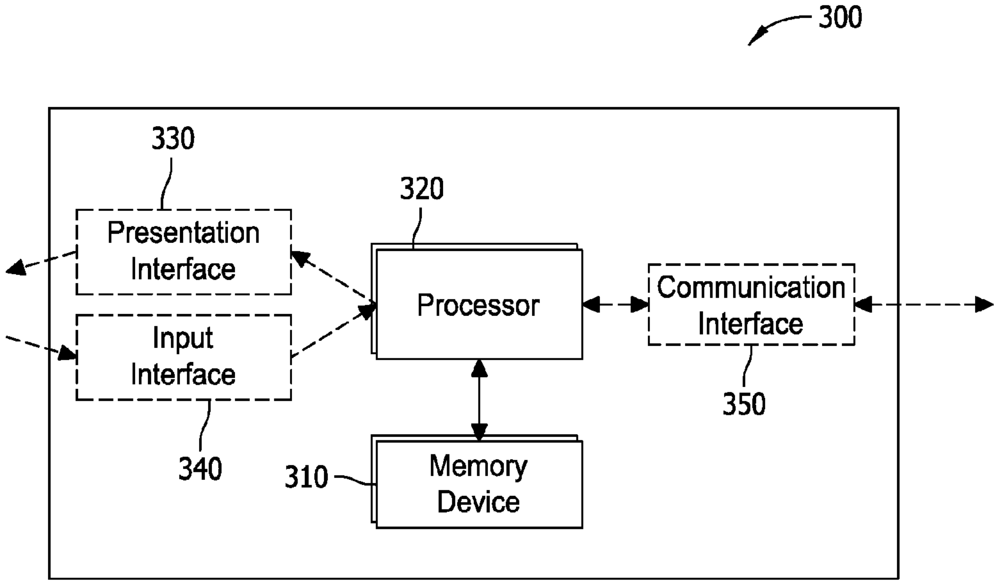

FIG. 3 is a schematic block diagram of a computing device 300, such as gaming controller 120 and/or gaming server 210. In the example embodiment, computing device 300 includes a memory device 310 and a processor 320 coupled to memory device 310 for use in executing instructions. More specifically, in the example embodiment, computing device 300 is configurable to perform one or more operations described herein by programming memory device 310 and/or processor 320. For example, processor 320 may be programmed by encoding an operation as one or more executable instructions and by providing the executable instructions in memory device 310.

Processor 320 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the example embodiment, memory device 310 includes one or more devices (not shown) that enable information such as executable instructions and/or other data to be selectively stored and retrieved. In the example embodiment, such data may include, but is not limited to, gaming information, operational data, and/or control algorithms. In the example embodiment, computing device 300 is configured to interact with the player of gaming controller 120. Alternatively, computing device 300 may use any algorithm and/or method that enable the methods and systems to function as described herein. Memory device 310 may also include one or more computer readable media, such as, without limitation, dynamic random access memory (DRAM), static random access memory (SRAM), a solid state disk, and/or a hard disk.

In the example embodiment, computing device 300 includes a presentation interface 330 that is coupled to processor 320 for use in presenting information to a user. For example, presentation interface 330 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 330 includes one or more display devices.

Computing device 300, in the example embodiment, includes an input interface 340 for receiving input from the user. For example, in the example embodiment, input interface 340 receives information suitable for use with the methods described herein. Input interface 340 is coupled to processor 320 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 330 and as input interface 340.

In the example embodiment, computing device 300 includes a communication interface 350 that is coupled to processor 320. In the example embodiment, communication interface 350 communicates with at least one remote device, such as another computing device 300. For example, communication interface 350 may use, without limitation, a wired network adapter, a wireless network adapter, and/or a mobile telecommunications adapter. A network (not shown) used to couple computing device 300 to the remote device may include, without limitation, the Internet, a local area network (LAN), a wide area network (WAN), a wireless LAN (WLAN), a mesh network, and/or a virtual private network (VPN) or other suitable communication means.

Figure 4:
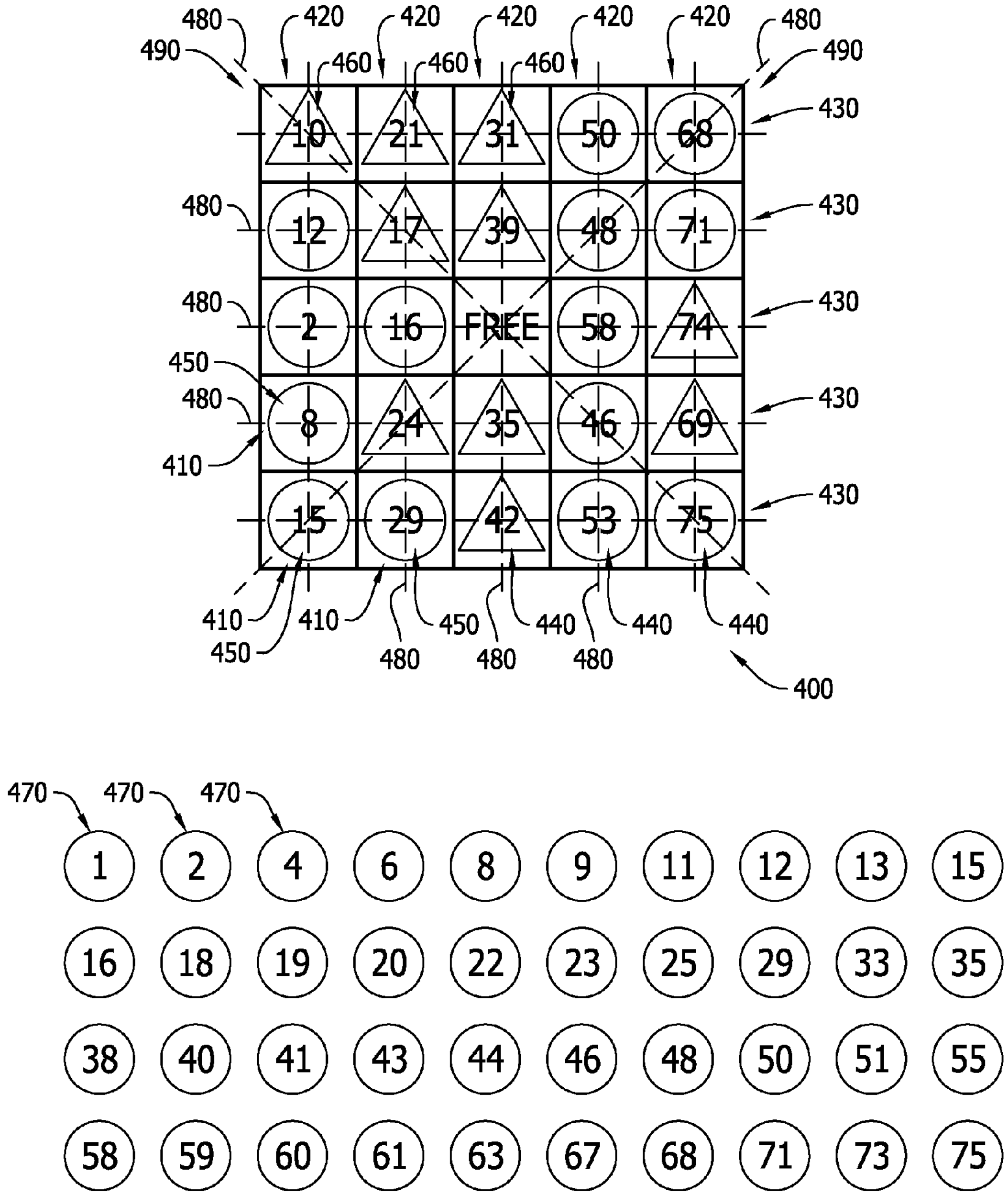

FIG. 4 shows a schematic illustration of a play area 400. As used herein, the term "play area" is used to generally describe a matrix (e.g., a bingo card) including a plurality of positions 410 arranged in a plurality of columns 420 and/or a plurality of rows 430. In the example embodiment, play area 400 is presented and/or displayed on presentation device 130 or, more broadly, gaming machine 100. Although the illustrated play area 400 includes five columns 420 and five rows 430, play area 400 may have any configuration that enables gaming machine 100 to function as described herein.

In the example embodiment, each position 410 is associated with a respective number and/or identifier 440. Specifically, in the example embodiment, each position 410 in the first (i.e., leftmost) column 420 is associated with a respective number between 1 and 15, each position 410 in the second column 420 is associated with a respective number between 16 and 30, each position 410 in the third column 420 is associated with a respective number between 31 and 45 (with the exception of the middle position 410, described further below), each position 410 in the fourth column 420 is associated with a respective number between 46 and 60, and each position 410 in the fifth (i.e., rightmost) column 420 is associated with a respective number between 61 and 75. Moreover, in the example embodiment, each position 410 is associated with a unique identifier 440 (i.e., play area 400 does not include duplicate numbers). In the example embodiment, the middle position 410 (i.e., the position 410 in the third row 430 of the third column 420) is associated with a "FREE" or wild identifier. Alternatively, each position 410 may be associated with any identifier 440 and/or any symbols may be used that enables gaming machine 100 to function as described herein.

In the example embodiment, each position 410 is associated with one of a plurality of markers including at least a first marker 450 and a second marker 460. For example, in the example embodiment, positions 410 associated with an identifier 440 that matches a drawn, called, or otherwise generated identifier 470 are associated with first marker 450, and positions 410 associated with an identifier 440 that does not match a drawn, called, or otherwise generated identifier 470 are associated with second marker 460. In the example embodiment, the middle position 410, which is associated with a "FREE" or wild identifier, may be treated as being associated with any marker in the plurality of markers. Alternatively, each position 410 may be associated with any marker for any reason that enables gaming machine 100 to function as described herein.

In the example embodiment, first marker 450 is shown as a circle, and second marker 460 is shown as a triangle. Alternatively, first marker 450 may be shown as a positive "daub" or mark, and second marker 460 may be shown as "clean" or unmarked. Alternatively, first marker 450 and/or second marker 460 may be any indication and/or have any characteristic that enables each marker to be distinguishable.

In one embodiment, a predetermined quantity of identifiers 470 are generated. For example, in the example embodiment, forty identifiers 470 are generated. Alternatively, a quantity associated with identifiers 470 (i.e., a number of identifiers) are determined based on a parameter. Any quantity of identifiers 470 may be generated that enables gaming machine 100 to function as described herein. In one embodiment, the generated identifiers 470 are randomly identified and/or selected, such as by a true random number generator (RNG), a pseudo-random number generator (PNG), or any other suitable randomization process. Alternatively, the generated identifiers 470 may be selected using any method and/or system that enables gaming machine 100 to function as described herein.

In the example embodiment, play area 400 includes a plurality of "paylines" or patterns 480 including a predetermined arrangement and/or combination of positions 410. For example, in the example embodiment, a pattern 480 may include each position 410 within a column 420, a row 430, and/or a five-position diagonal 490. Alternatively, pattern 480 may include any arrangement and/or combination of positions 410 that enables gaming machine 100 to function as described herein. In one embodiment, a quantity associated with patterns 480 (i.e., a number of patterns 480) are determined based on a play input. Any quantity of patterns 480 may be considered in the game of chance that enables gaming machine 100 to function as described herein.

In the example embodiment, pattern 480 satisfies a predetermined threshold (i.e., is a "winning" pattern) when a predetermined quantity of positions 410 within pattern 480 are associated with a common marker. More specifically, in the example embodiment, pattern 480 is determined to be a winning pattern when each position 410 within pattern 480 is associated with first marker 450. For example, in the example embodiment, each position 410 within the fourth column 420 is associated with first marker 450 and, thus, is determined to be a winning pattern based on first marker 450.

Similarly, in the example embodiment, pattern 480 is determined to be a winning pattern when each position 410 within pattern 480 is associated with second marker 460. For example, in the example embodiment, each position 410 within the third column 420 (with the exception of the middle position 410) is associated with second marker 460. Because the middle position 410 is associated with a "FREE" or wild identifier, in the example embodiment, the middle position 410 may be associated with the first marker 450 and/or the second marker 460. Accordingly, in the example embodiment, the third column 450 is determined to be a winning pattern based on the second marker 460. Alternatively, any combination of positions 410 associated with any combination of markers may satisfy the predetermined threshold that enables gaming machine 100 to function as described herein.

Figure 5:
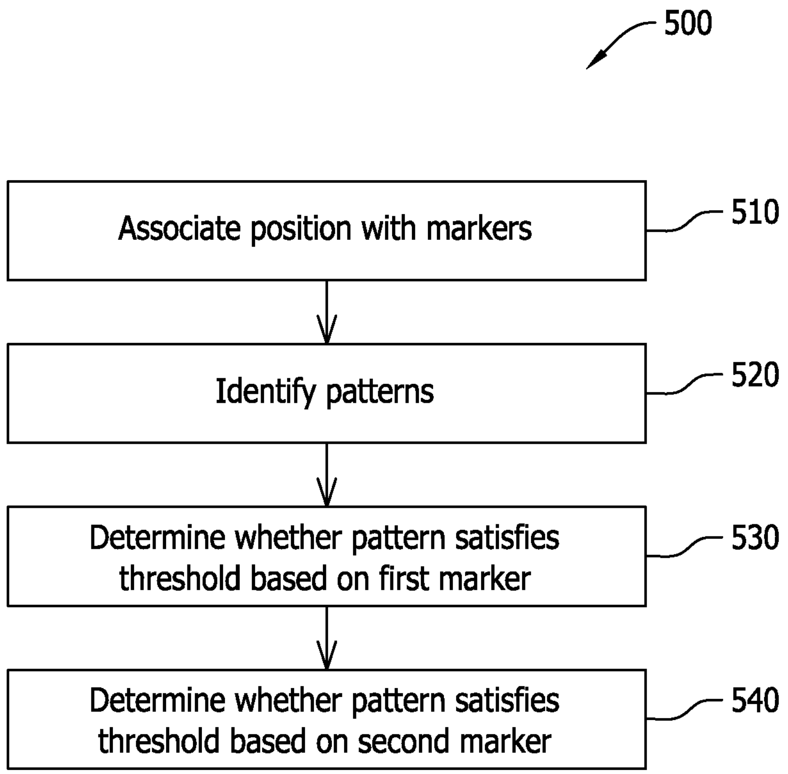

FIG. 5 is a flowchart of an example method 500 for presenting a game of chance on a gaming machine 100. In the example embodiment, method 500 is performed by a computing device including a processor and a memory, such as gaming controller 120 and/or gaming server 210. In some embodiments, one or more operations in method 500 may be performed by one or more gaming controllers 120, one or more gaming servers 210, and/or any other computing device or combination thereof.

In the example embodiment, method 500 includes receiving a play input from a player. For example, in the example embodiment, the play input is received from the player at input interface 340. In one embodiment, a predetermined quantity of identifiers 470 are generated. In another embodiment, the quantity of identifiers 470 are determined based on a parameter, such as the play input. For example, a first quantity of identifiers 470 may be generated when the play input is associated with a first bet (e.g., a single bet), and a second quantity of identifiers 470 greater than the first quantity may be generated when the play input is associated with a second bet (e.g., a maximum permitted wager). In yet another embodiment, identifiers 470 are generated until a predetermined threshold is satisfied. For example, identifiers 470 may be generated until a pattern satisfies a predetermined first threshold and/or a number of identifiers satisfies a predetermined second threshold.

In the example embodiment, each position 410 is associated with a marker based on the generated identifiers 470. For example, in the example embodiment, each position 410 associated with an identifier 440 that matches a generated identifier 470 is associated 510 with a first marker 450, and each position 410 associated with an identifier 4470 that does not match a generated identifier 470 is associated 510 with a second marker 460.

In the example embodiment, at least one pattern 480 is identified 520 for consideration in the game of chance. In the example embodiment, a quantity of patterns 480 is determined based on the play input. For example, in the example embodiment, a first quantity of patterns 480 are available and/or are considered in the game of chance when the play input is associated with a first bet (e.g., a single bet), and a second quantity of patterns 480 greater than the first quantity are available and/or are considered in the game of chance when the play input is associated with a second bet (e.g., a maximum permitted wager). Alternatively, a predetermined quantity of patterns 480 are available and/or are considered in the game of chance.

In the example embodiment, it is determined 530 whether pattern 480 satisfies a predetermined threshold based on the first marker 450. For example, in the example embodiment, it is determined 530 whether pattern 480 is a winning pattern based on an arrangement and/or combination of first markers 450 within pattern 480. Moreover, in the example embodiment, it is determined 540 whether pattern 480 satisfies a predetermined threshold based on the second marker 460. For example, in the example embodiment, it is determined 540 whether pattern 480 is a winning pattern based on an arrangement and/or combination of second markers 460 within pattern 480. Pattern 480 is evaluated based on each marker of the plurality of markers, and an award and/or reward may be determined based on the determination 530, 540. In the example embodiment, the plurality of positions 410 and/or the plurality of markers 450, 460 are presented to the player. For example, in the example embodiment, the positions 410 and/or markers 450, 460 are presented to the player at presentation interface 330.

One of ordinary skill in the art, guided by the teaching herein, will appreciate that one or more operations in method 500 may be performed repeatedly. For example, signals may be received repeatedly, and at least a portion of the steps described above may be performed based on each received signal.

As such, play experience for the player may be enhanced by the player based on the anticipation and/or realization that additional pay lines are possible. The embodiments described herein facilitate increasing a number of opportunities to win a game of chance. The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an example gaming environment, embodiments of the present disclosure are operational with numerous other general purpose or special purpose communication environments or configurations. The gaming environment is not intended to suggest any limitation as to the scope of use or functionality of any aspect of the disclosure. Moreover, the gaming environment should not be interpreted as having any dependency or requirement relating to any one or combination of components illustrated in the example operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Washington; and Sybase is a registered trademark of Sybase, Dublin, Calif.)

The present disclosure uses examples to disclose the best mode and also to enable any person skilled in the art to practice the claimed subject matter, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for presenting a game of chance on a gaming machine, the method implemented using a computing device, the method comprising:

displaying a first plurality of identifiers at a plurality of positions;

generating a second plurality of identifiers for each of the plurality of positions;

associating each position in the plurality of positions with a first marker if an identifier in the first plurality of identifiers matches an identifier in the second plurality of identifiers;

associating each position in the plurality of positions with a second marker if an identifier in the first plurality of identifiers does not match an identifier in the second plurality of identifiers;

determining whether at least one pattern of a plurality of patterns satisfies a predetermined first threshold based on the first marker; and determining whether at least one pattern of the plurality of patterns satisfies the predetermined first threshold based on the second marker.

2. A method in accordance with claim 1 further comprising:

determining whether a quantity associated with the second plurality of identifiers satisfies a predetermined second threshold.

3. A method in accordance with claim 1 further comprising:

receiving a play input; and determining a quantity associated with the plurality of patterns based on the play input.

4. A method in accordance with claim 1 further comprising:

receiving a play input; and determining a quantity associated with the second plurality of identifiers based on the play input.

5. One or more non-transitory computer-readable storage media having computer-executable instructions embodied thereon, wherein, when executed by at least one processor, the computer-executable instructions cause the at least one processor to:

display a first plurality of identifiers at a plurality of positions;

generate a second plurality of identifiers for each of the plurality of positions;

associate each position in the plurality of positions with a first marker if an identifier in the first plurality of identifiers matches an identifier in the second plurality of identifiers;

associate each position in the plurality of positions with a second marker if an identifier in the first plurality of identifiers does not match an identifier in the second plurality of identifiers;

determine whether at least one pattern of a plurality of patterns satisfies a predetermined first threshold based on the first marker; and determine whether at least one pattern of the plurality of patterns satisfies the predetermined first threshold based on the second marker.

6. One or more non-transitory computer-readable storage media in accordance with claim 5, wherein the computer-executable instructions further cause the at least one processor to:

determine whether a quantity associated with the second plurality of identifiers satisfies a predetermined second threshold.

7. One or more non-transitory computer-readable storage media in accordance with claim 5, wherein the computer-executable instructions further cause the at least one processor to:

receive a play input; and determine a quantity associated with the plurality of patterns based on the play input.

8. One or more non-transitory computer-readable storage media in accordance with claim 5, wherein the computer-executable instructions further cause the at least one processor to:

receive a play input; and determine a quantity associated with the plurality of identifiers based on the play input.

9. A gaming machine comprising:

a frame; and a gaming controller coupled to the frame, the gaming controller comprising:

at least one processor; and one or more non-transitory computer-readable storage media having computer-executable instructions embodied thereon, wherein, when executed by the at least one processor, the computer-executable instructions cause the at least one processor to:

display a first plurality of identifiers at a plurality of positions;

generate a second plurality of identifiers for each of the plurality of positions;

associate each position in a plurality of positions with a first marker if an identifier in the first plurality of identifiers matches an identifier in the second plurality of identifiers;

associate each position in the plurality of positions with a second marker if an identifier in the first plurality of identifiers does not match an identifier in the second plurality of identifiers;

determine whether at least one pattern of a plurality of patterns satisfies a predetermined first threshold based on the first marker; and determine whether at least one pattern of the plurality of patterns satisfies the predetermined first threshold based on the second marker.

10. A gaming machine in accordance with claim 9, wherein the non-transitory computer-executable instructions further cause the at least one processor to:

determine whether a quantity associated with the second plurality of identifiers satisfies a predetermined second threshold.

11. A gaming machine in accordance with claim 9, wherein the non-transitory computer-executable instructions further cause the at least one processor to:

receive a play input; and determine a quantity associated with the plurality of patterns based on the play input.

12. A gaming machine in accordance with claim 9, wherein the non-transitory computer-executable instructions further cause the at least one processor to:

receive a play input; and determine a quantity associated with the second plurality of identifiers based on the play input.

* * * * *